(12) United States Patent
Sönajalg et al.

(10) Patent No.: US 8,564,153 B2
(45) Date of Patent: Oct. 22, 2013

(54) HOLLOW SINGLE-SIDE SUPPORTED DIRECT-DRIVE WIND TURBINE GENERATOR

(75) Inventors: Andres Sönajalg, Tallinn (EE); Oleg Sönajalg, Tallinn (EE)

(73) Assignees: Andres Sönajalg, Tallinn (EE); Oleg Sönajalg, Tallinn (EE)

( * ) Notice: Subject to any disclaimer, the term of this patent is extended or adjusted under 35 U.S.C. 154(b) by 0 days.

(21) Appl. No.: 13/055,470

(22) PCT Filed: Jul. 24, 2009

(86) PCT No.: PCT/IB2009/053564
§ 371 (c)(1),
(2), (4) Date: Feb. 23, 2011

(87) PCT Pub. No.: WO2010/010544
PCT Pub. Date: Jan. 28, 2010

(65) Prior Publication Data
US 2011/0309627 A1 Dec. 22, 2011

(30) Foreign Application Priority Data
Jul. 24, 2008 (EE) .................................. 200800049

(51) Int. Cl.
*H02P 9/04* (2006.01)
(52) U.S. Cl.
USPC .............................................. 290/55; 290/44
(58) Field of Classification Search
USPC ....................................................... 290/44, 55
See application file for complete search history.

(56) References Cited

U.S. PATENT DOCUMENTS

| | | | | |
|---|---|---|---|---|
| 6,781,276 | B1 * | 8/2004 | Stiesdal et al. | 310/254.1 |
| 7,179,056 | B2 * | 2/2007 | Siegfriedsen | 416/170 R |
| 7,205,678 | B2 * | 4/2007 | Casazza et al. | 290/55 |
| 7,360,310 | B2 * | 4/2008 | Bagepalli et al. | 29/898.08 |
| 7,431,567 | B1 * | 10/2008 | Bevington et al. | 416/244 R |
| 7,944,074 | B2 * | 5/2011 | Longtin et al. | 290/55 |
| 2006/0220389 | A1 * | 10/2006 | Shibata et al. | 290/55 |
| 2008/0012346 | A1 * | 1/2008 | Bertolotti | 290/55 |
| 2009/0015020 | A1 * | 1/2009 | Stiesdal | 290/55 |
| 2010/0264664 | A1 * | 10/2010 | Lauke | 290/55 |

FOREIGN PATENT DOCUMENTS

EP 1780409 5/2007

* cited by examiner

*Primary Examiner* — Julio Gonzalez Ramirez
*Assistant Examiner* — S. Mikailoff
(74) *Attorney, Agent, or Firm* — Soroker-Agmon

(57) ABSTRACT

A wind turbine structure, including: a hollow cylindrical main body having an upper part and a lower part, a generator part surrounded by the main body. The generator part including: a hollow cylindrical wind turbine rotor body having an exterior surface and, a stator body surrounding the wind turbine rotor body and having an inner surface and an exterior surface, a bearing surrounding the exterior surface of the wind turbine rotor body at an impeller head end and rotatably coupling between the exterior surface of the wind turbine rotor body and the inner surface of the stator body, and wherein the stator body is secured only at the impeller head end to the lower part of the main body, whereas the exterior surface of the stator body is separated by an air gap from the upper part of the main body.

7 Claims, 4 Drawing Sheets

HOLLOW SINGLE-SIDE SUPPORTED DIRECT-DRIVE WIND TURBINE GENERATOR

TECHNICAL FIELD

The present invention relates, in general, to equipment for producing and storing wind power, and in particular, to an improved construction of a wind turbine.

DESCRIPTION OF RELATED ART

There are several types of wind turbine systems comprising a base, a tower and a wind turbine structure (i.e. rotary engine) fixed to the tower. The earlier wind turbine construction included a wind turbine connected to blades, a main shaft, a reducer and a generator part with a stator and a rotor. These kinds of generators suffer from the problem of material fatigue caused by the transmission of motion from the blade via the main shaft, reducer to the generator. Furthermore, such a structure cannot be used for wind turbines that exceed the capacity of 1,500 kW as the torque generated by the main shaft and reducer becomes too excessive, and the construction suffers from exhaustion and material fatigue, which may result in damage to the structure.

Another known solution of wind turbines is a reducer-free wind turbine produced by a company called Enercon using the inventions of Wobben Aloys, where the tower is connected to a knee-shaped console, which is in turn connected to a main shaft connected to an impeller head that is fixed to a generator part. One such solution has been described in a patent application number EP1791150, filed on Jun. 13, 2007, where a console with a main shaft, nacelle and rotor, is connected to a tower. The weakness of such a solution lies in the connections of the console and the tower as the wind power acts upon the turbine (blade length 35-40 m) is transferred to the connections of the console, which are thus subject to material fatigue and may break. Furthermore, these kinds of wind turbines are also problematic due to insufficient cooling; since on the one hand it is desirable to cool the generator with the air flow yet on the other hand the generator windings need to be hermetically sealed (i.e. airtight) to prevent damage from the moisture in the air. Different solutions have been proposed, but so far the cooling and structural reliability remain problematic. Also, the proposed solutions are expensive and material consuming.

The closest solution of a wind power generator is that described in the patent application No. P200700038 filed by the present authors, the development of which is the present invention. Therefore, the following description includes references to the details presented in the previous application.

SUMMARY OF INVENTION

The present invention proposes a wind turbine structure, which would allow:
- To improve the balance between the part installed on the wind turbine and the tower;
- To separate the generator from the function of the bearing structure, which allows not to direct the forces coming from the turbine to the generator construction (except for the torque);
- To cool the assemblies and components in the body of the wind turbine effectively;
- To ensure the required air-tightness considering that the wind turbines are mostly positioned in the sea, ocean and on the coast, where in addition to the humidity the wind also carries the particles of mineral salts from the sea water, which in turn lead to premature corrosion of the components, considerable deterioration of the insulation of the generator and disconnections in the electrical windings.

For that purpose the authors of the invention suggest a wind turbine structure where the main shaft of the wind turbine is concurrently a generator rotor body that is a hollow, tubular structure, which is connected from one end to the impeller head with blades. The wind turbine rotor body is supported in the generator body, which is formed of a tube, with the help of a bearing or bearings, which have been installed at the center of the outer surface of the main shaft onto the first part. The bearings can comprise both ball bearings and roller bearings (also inclined roller bearings), for the state-of-the-art technologies enable to make bearing rollers and bearings with any size. The above structure makes the contact between the wind turbine rotor body and the main frame air-tight. Simultaneously, the above structure allows air flow through the wind turbine rotor body to cool the assemblies and components.

BRIEF DESCRIPTION OF THE DRAWINGS

In the following, the invention is described in more detail in reference to the attached drawings, where.

DETAILED DESCRIPTION OF THE INVENTION

Figure 1:
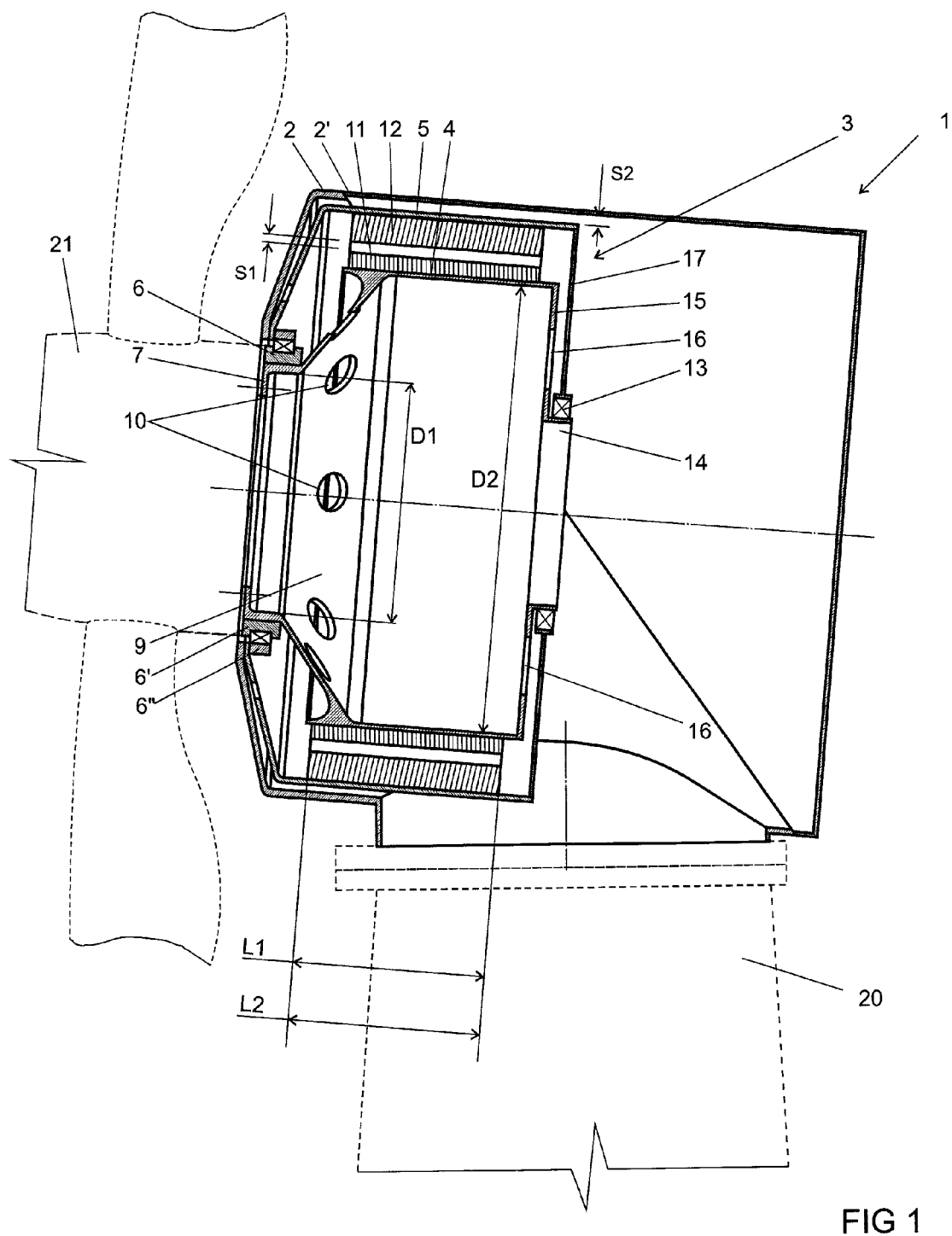
FIG. 1 shows a cross-section of a wind turbine according to the present invention.
Figure 2:
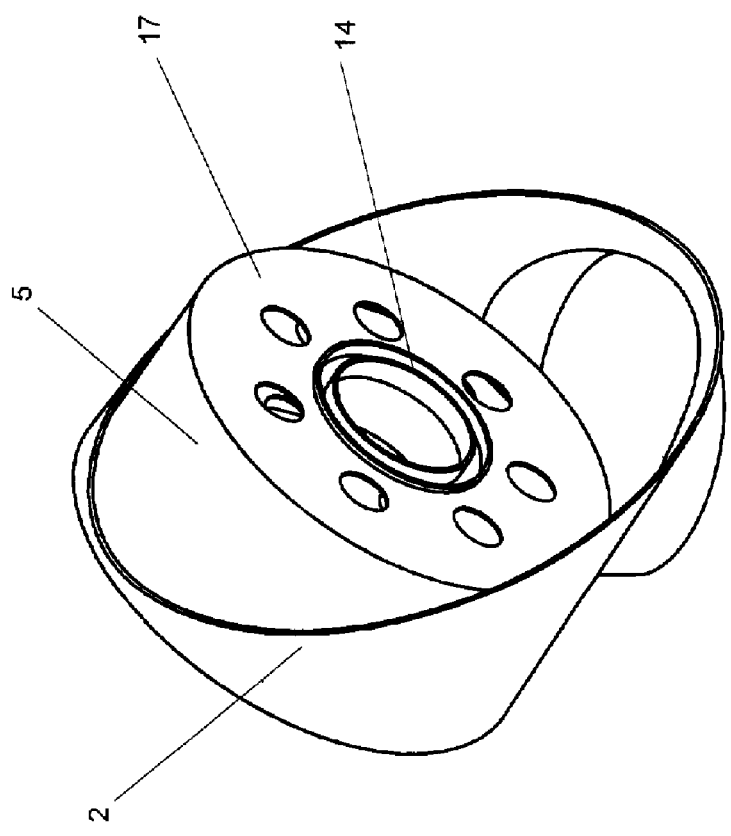
FIG. 2 shows a perspective rear view of a generator part and a wind turbine rotor body, whereas the upper part of the body has been removed.
Figure 3:
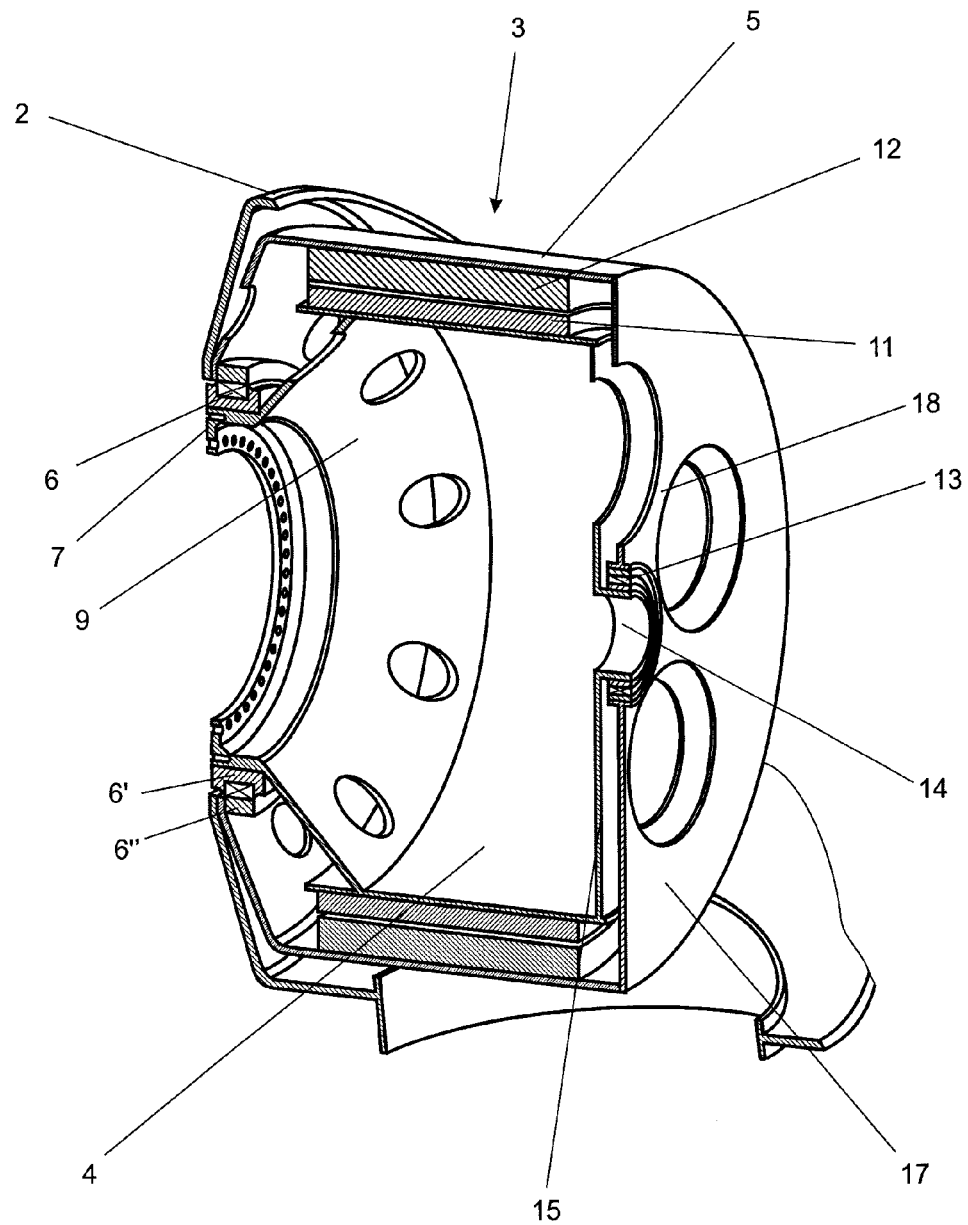
FIG. 3 shows a perspective view of a generator part of a wind turbine according to the invention.
Figure 4:
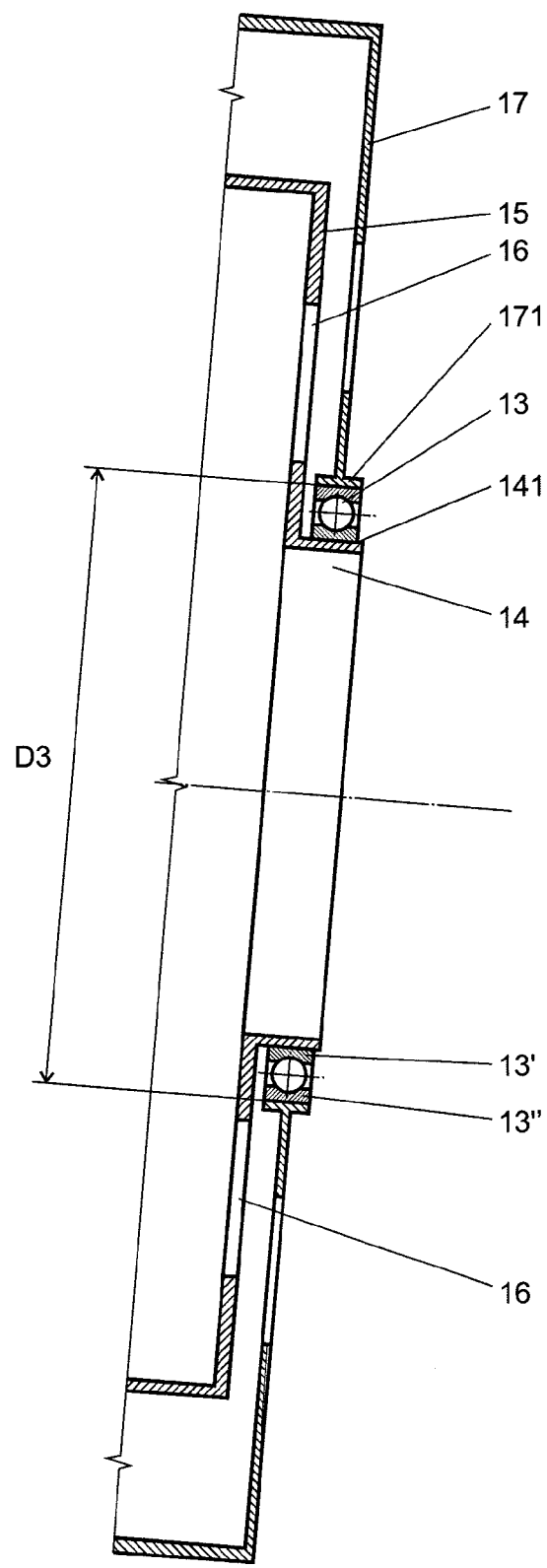
FIG. 4 shows an enlarged partial view of a wind turbine rotor end plate and stator end plate as shown in FIG. 1.

The wind turbine structure 1 depicted in the drawings is via the connections known in the field of the art to the top of a bearing tower 20, etc. of the wind turbine. Wind turbine structure 1 comprises a two part main body 2, 2' (a lower part 2 and an upper part 2' shown in FIG. 1), which surrounds a generator part 3 connected to an impeller head 21 that holds the blades of the generator, and a connection part (not shown) by which the wind turbine structure 1 is fixed to the tower 20, which connects to the ground on a special base (not shown). The interior of the tower 20 has the assemblies and components arranged and installed, which are necessary for the operation of the wind turbine structure 1.

Generator part 3 is formed of a wind turbine rotor body 4 and of a stator body 5.

The impeller head 21 is connected to the wind turbine rotor body 4 of the generator part 3 using a connection method known in the field of construction of wind turbines, wherefore this is not explained further hereunder. Furthermore, the impeller blades are fixed to the impeller head applying the solutions known in the state of the art.

The main body 2, 2' of the wind power generator has been divided into two parts 2, 2' so that the lower part 2 of the main body 2, 2' is joined to the tower 20 and the upper part 2' of the main body 2, 2' is connected to the lower part 2 of the main body 2, 2' at the final stage of the assembly of the wind turbine structure 1. The use of such a construction for the main body 2, 2' enables to lift the components and assemblies of the wind turbine structure 1 in place and assemble them in a quick and easy manner.

The wind turbine rotor body 4 is an open ended a hollow cylindrical detail, which at the impeller head 21 end is supported by the lower part 2 of the the main body 2, 2' via a bearing 6, having an inner bearing ring 6' and an outer bearing ring 6". The bearing could be a double-row conical roller bearing produced by a company such as SKF, which is, first and foremost, meant to operate under heavy loads, and in conditions where composite loads act upon the structure. Furthermore, another type of bearing may be used, which is compatible with the conditions arising from the bearing and impacting load.

The inner bearing ring 6' of the bearing 6 surrounds the wind turbine rotor body 4 that is the inner bearing ring 6' has been fixed to the exterior surface of the wind turbine rotor body 4 with tight contact or in other embodiments to flanges fixed to the exterior surface of the wind turbine rotor body 4 with bolts (not shown), in order to ensure tight contact between the inner bearing ring 6' of the bearing 6 and the exterior surface of the wind turbine rotor body 4. At the side of the impeller head 21 of the wind turbine rotor body 4 is a flange 7 running towards the inside of the axis of the wind turbine rotor body 4, which has drilled openings for securing devices and which shall hold the impeller head 21 installed in the course of assembly of the wind turbine structure 1.

The main body 2,2' of the wind turbine has a stator body 5 secured to lower part 2 of the main body 2, 2', which body surrounds the wind turbine rotor body 4, and which is also connected to stator windings 12 and the outer bearing ring 6" of the bearing 6. In this way an immobile connection of the outer bearing ring 6" of the bearing 6 and stator body 5 to the main frame 2 is secured. The stator body 5 is secured only at the impeller head end to the lower part 2 of the main body 2, 2'. The exterior surface of the stator body is separated by an air gap S2 from the upper part 2' of the main body 2, 2'.

The wind turbine rotor body 4 depicted in the drawings also includes a conical part 9, which enables to increase the inner diameter D1 to D2 (D2>D1) of the wind turbine rotor body 4. The conical part 9 also has openings 10, through which the air used for cooling can move into stator body 5. Rotor windings or magnets 11 are fixed on to the outer surface of the wind turbine rotor body 4 on the side facing stator body 5. On the inner surface of the stator body 5 stator windings 12 are fixed, having a width L2 which corresponds to width L1 of the rotor windings 11. At the same time, both rotor windings and stator windings could be divided into segments, etc. in a way to facilitate the maintenance and repair of the wind turbine.

In order to ensure an air gap S1 between the stator 12 and rotor 11 required for their proper operation, the stator body 5 and the wind turbine rotor body 4 are mutually supported via a support bearing 13. Support bearing 13 has been fixed with its inner bearing ring to a support part 14 on the end of the wind turbine rotor body 4. The support part 14 is fixed to a rotor end plate 15 located at the rear part of the wind turbine rotor body 4, which is at a distance from the impeller head, being connected to the wind turbine rotor body. The rotor end plate 15 incorporates openings 16 for cooling air. The support part 14 is located at the center of the rotor end plate 15 in the axis direction of the wind turbine rotor body 4 and is a cylindrical detail, the exterior surface 141 of which holds a connection with the inner ring 13' of the support bearing 13.

The outer ring 13" of the support bearing 13 is fixed to stator body 5 via a stator end plate 17 with a support flange 171 at the end of the stator body 5. The support flange 171 has an inner diameter D3 for accommodating outer ring 13" of the support bearing 13. The rotor and stator end plates 15, 17 of both the wind turbine rotor body 4 and the stator body 5 may be made with spokes 18 in order to ensure free passage for cooling air from the generator part.

The main task of the support bearing 13 is to ensure the permanent air gap S1 between the rotor 11 and the stator 12, which is in turn necessary for the operation of the wind turbine structure 1.

The advantage of the wind turbine described above is the fact that the center of gravity of the entire wind turbine structure 1, mostly that of the rotor 11 and stator 12 could be brought closer to the central axle of the tower, which in turn reduces the load acting on the structure of the main body 2, 2'.

The lower part of main body 2, 2' of the wind turbine structure 1 may be fixed to the tower with flange connections, which are not described in further detail hereunder as they are not related to the technical solution presented in the invention.

The specialists of the field understand that the wind power generator construction according to the invention is not limited to the embodiment described above. For example, the length of the wind turbine rotor body could be modified so that the dimension of the entire wind turbine from blades to the rear end of the generator part can be minimized and/or optionally only one bearing (e.g. 6 or 13) may be used to support wind turbine rotor body 4 in such a way the construction is made lighter and its installation and operation easier.

The invention claimed is:

1. A wind turbine structure (1) comprising:
   a hollow cylindrical main body (2, 2') having an upper part (2') and a lower part (2);
   a generator part (3) surrounded by the main body (2, 2') and having an impeller head end near a position for attaching an impeller head (21);
   the generator part (3) comprising:
      a hollow cylindrical wind turbine rotor body (4) having an exterior surface with rotor windings or magnets (11) surrounding the exterior surface;
      a stator body (5) surrounding the wind turbine rotor body (4) and having an inner surface and an exterior surface, with stator windings (12) on the inner surface of the stator body (5) facing the rotor windings or magnets on the exterior surface of the wind turbine rotor body (4);
      a bearing (6) surrounding the exterior surface of the wind turbine rotor body (4) at the impeller head end and rotatably coupling the exterior surface of the wind turbine rotor body (4) with the inner surface of the stator body (5); and
   wherein the stator body (5) is secured only at the impeller head end to the lower part (2) of the main body (2, 2'), whereas the exterior surface of the stator body (5) is separated by an air gap (S2) from the upper part (2') of the main body (2, 2').

2. A wind turbine structure (1) according to claim 1, wherein the stator windings (12) on the inner surface of the stator body (5) have a width (L2) equal to a width (L1) of the rotor windings or magnets (11) provided on the exterior surface of the wind turbine rotor body (4); and
   wherein between the windings (12) of the stator and the windings (11) of the rotor there is a fixed-size air gap (S1).

3. A wind turbine structure (1) according to claim 1, wherein the generator part (3) has a rear end further away from the impeller head end;
   at the rear end of the generator part (3), the wind turbine rotor body (4) comprises a rotor end plate (15) with a cylindrical support part (14) having an exterior surface (141); the exterior surface (141) of the support part (14) incorporates an inner ring (13") of a support bearing (13), and wherein at the rear end, the stator body (5) comprises a stator end plate (17) with a support flange (171) having an inner diameter (D3) for accommodating an outer ring (13") of the support bearing (13);

wherein the inner ring (13') of the support bearing (13) and the outer ring (13") of the support bearing (13) rotatably couple between the wind turbine rotor body (4) and the stator body (5) at the rear end.

4. A wind turbine structure (1) according to claim 3, wherein the rotor end plate (15) and the stator end plate (17) are made of spokes (18) to allow passage of cooling air through the generator part (3).

5. A wind turbine structure (1) according to claim 1, whereas the bearing (6) is a three-row roller bearing.

6. A wind turbine structure (1) according to claim 1, wherein the bearing (6) includes an inner bearing ring (6') that surrounds the exterior surface of the wind turbine rotor body (4), and an outer bearing ring (6") that is connected to the inner surface of the stator body (5).

7. A wind turbine structure (1) according to claim 6 wherein the outer bearing ring (6") is fixed to the lower part (2) of main body (2, 2') at the impeller end.

* * * * *